S. C. WENTWORTH.
Improvement in Self-Closing Basin-Cocks.
No. 133,131. Patented Nov. 19, 1872.
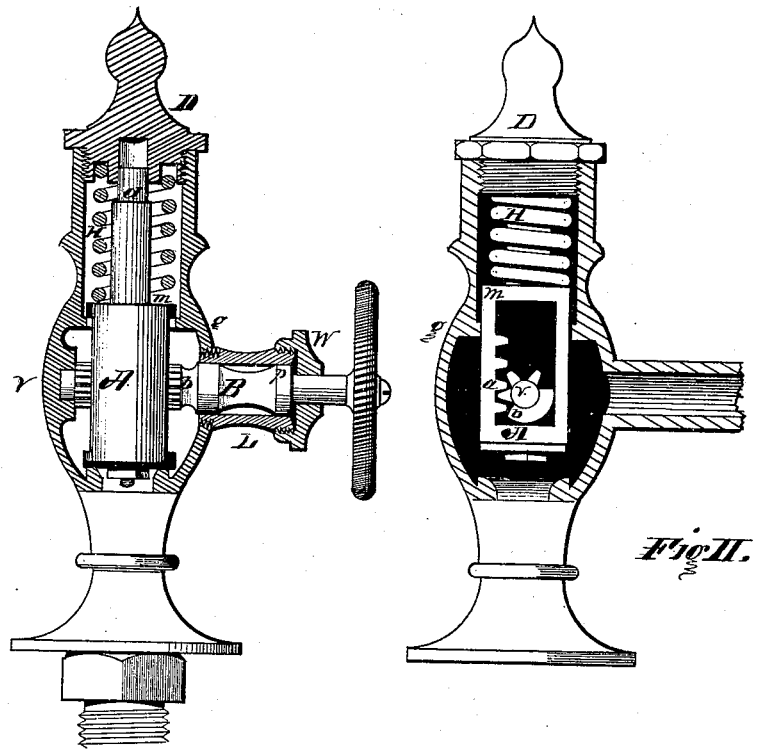
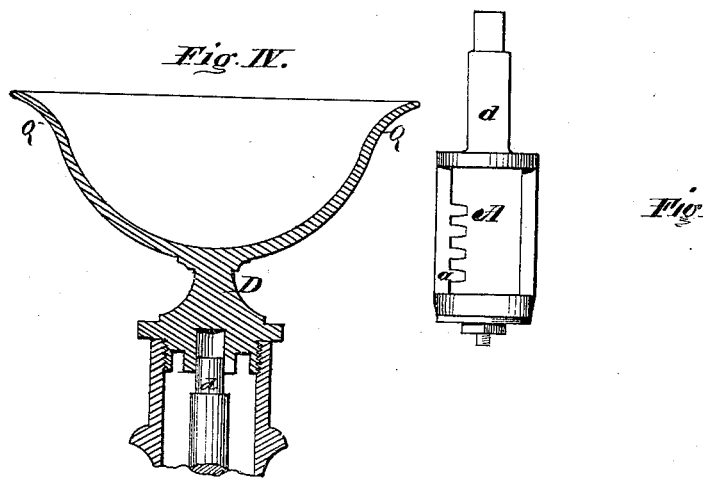
Witnesses
E. Dudley Chapin.
Wm B. Parker.
Inventor.
Samuel C. Wentworth
by his Attorneys
Gardiner & Hyde

UNITED STATES PATENT OFFICE.

SAMUEL C. WENTWORTH, OF HAYDENVILLE, MASSACHUSETTS.

IMPROVEMENT IN SELF-CLOSING BASIN-COCKS.

Specification forming part of Letters Patent No. 133,131, dated November 19, 1872.

*To all whom it may concern:*

Be it known that I, SAMUEL C. WENTWORTH, of Haydenville, Hampshire county, State of Massachusetts, have invented certain Improvements in Self-Closing Basin-Cocks, of which the following is a specification:

My improvements relate to the construction of the valve, together with the mechanism for operating it, and to the construction of the case to receive these parts and to afford the necessary bearings, the whole forming a self-closing basin-cock, which I will now describe.

In the drawing, Figures I and II are partial sectional elevations. Fig. III is a detail view of the valve. Fig. IV shows the combination with a basin-cock of a soap-dish.

A is the valve of the general form shown in Fig. III, having space through it to admit of its being bisected by the rod B, which rod, being provided with a pinion, $b$, engaging a a rack, $a$, upon the inner side of the valve A, and being held in bearings in the case upon each side of the valve, by its partial rotation, compels the rise of the valve from its seat. The valve-stem $d$ is received within and guided by the top D of the cock, and the collar $g$ surrounds and guides the body of the valve. Surrounding the stem $d$, and having its ends bearing respectively upon the shoulder $m$ of the valve and against the top D, is the coil-spring H, which supplies the resistance against which the valve is manually raised, and which returns it to its seat.

I do not wish to confine myself to a rack and pinion as the means of raising the valve, as a crank-arm proceeding from the shaft B and coming beneath a single spur upon the inner side of the valve, or an eccentric from said shaft bearing against the inner side of the top of the valve, would accomplish the same result; but the rack and pinion have the advantage of permitting the valve to wear or sink upon its seat while working always together, as might not be the case in other mechanical equivalents were any relative change of position of the parts to take place.

Stock is left in the case to receive and form a bearing for the end $v$ of the rod B, and a sleeve, L, projecting from the case forms a secure bearing for the rod upon the opposite side of the case and permits it to be held in place and packed by the nut W coming against the shoulder of the bearing-surface $p$ of rod B and over sleeve L.

By the arrangement of parts the practical construction of a basin-cock is much simplified, as the valve in one direction and the rod B and its bearings in the other can be ground in place to fit, and by the arrangement of the operating-handle upon the side of the cock I am able to avoid the necessity of packing any joint above or near the coil-spring.

Now, having described my invention, what I claim is—

1. The valve A, rod B, spring H, and case $g$, when constructed, combined, and arranged for operation substantially as set forth.

2. In combination with the subject-matter of the first clause of claims, I claim the rack and pinion $d\ d$ and disk-handle $x$, arranged to operate substantially as described.

3. In combination with the cap D of a basin-cock, the soap-dish Q, when constructed and arranged substantially as shown and described.

SAMUEL C. WENTWORTH.

Witnesses:
CHESTER B. HARFORD,
J. H. WENTWORTH.